United States Patent
Haas et al.

(10) Patent No.: US 6,881,771 B2
(45) Date of Patent: Apr. 19, 2005

(54) PROCESS FOR PRODUCING PRESS MOLDED MATERIALS

(75) Inventors: Peter Haas, Haan (DE); Theodore Frick, Moon Township, PA (US); Ingo Brassat, Leverkusen (DE); Donald-Richard Larimer, Bergisch Gladbach (DE); Andreas Pielasch, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 256 days.

(21) Appl. No.: 10/223,546

(22) Filed: Aug. 19, 2002

(65) Prior Publication Data

US 2003/0038394 A1 Feb. 27, 2003

(30) Foreign Application Priority Data

Aug. 22, 2001 (DE) .......................... 101 41 209

(51) Int. Cl.⁷ ................................. B27N 3/08
(52) U.S. Cl. ............................ 524/14; 524/13; 264/109
(58) Field of Search .......................... 264/109; 524/13, 524/14

(56) References Cited

U.S. PATENT DOCUMENTS

| 4,546,039 A | 10/1985 | Horacek et al. | 428/357 |
| 5,179,143 A | 1/1993 | König et al. | 524/35 |

FOREIGN PATENT DOCUMENTS

| EP | 0 095 594 | 5/1983 |
| EP | 1 201 695 | 5/2002 |
| EP | 1 201 696 | 5/2002 |
| WO | 95/10555 | 4/1995 |
| WO | 99/19141 | 4/1999 |

*Primary Examiner*—Mary Lynn Theisen
(74) *Attorney, Agent, or Firm*—Joseph C. Gil; Lyndanne M. Whalen

(57) ABSTRACT

Composite materials are made by press molding a lignocellulose-containing materials glued with a specified type of binder in which the cold bonding strength of the molded lignocellulose-containing material is increased.

3 Claims, No Drawings

PROCESS FOR PRODUCING PRESS MOLDED MATERIALS

BACKGROUND OF THE INVENTION

The invention provides a process for producing a composite material by press molding lignocellulose-containing material glued with a binder in which the cold bonding strength of the lignocellulose-containing material is increased by using a specific type of binder and composite articles made by this process.

Press molded materials as finished products made from lignocellulose raw materials such as wood chips, wood fibers or veneers and binders or glues are manufactured by compression at different temperatures. Such molded materials play a substantial role as high-quality materials for the furniture, construction and packaging sectors.

Important binders for the production of these products are amino resins, phenolic resins and binders based on polyisocyanates from the diphenylmethane series (pMDI).

The disadvantage of the known pMDI binders is the poor cold bonding strength of the glued products. This becomes obvious at the edge regions when the glued cold prepressed moldings are moved without lateral support during the manufacturing process. Disintegration then takes place in the edge region so the molding then has to be trimmed back to the position of the broken edge.

A variety of suggestions has been made to solve this problem. According to EP-A 352 558, the cold bonding strength is improved by using polyisocyanates, compounds with at least two hydrogen atoms which can react with isocyanates and alkylene carbonates. EP-A 93 357 describes prepolymers based on urethane-modified diphenylmethane diisocyanates as binders. WO 99/19141 discloses binders made from diphenylmethane diisocyanates and isocyanate-reactive polymers for the production of plywood by veneer press molding.

SUMMARY OF THE INVENTION

It has now been found that the cold bonding strength during the processing of particularly susceptible chips can be greatly improved when pMDI prepolymers which have been urethane-modified by reaction with EO-rich hydroxy-functional polyethers are used as the binder.

DETAILED DESCRIPTION OF THE INVENTION

The present invention provides a process for producing press molded materials based on lignocellulose materials and prepolymers as the binder in which a urethane group-containing prepolymer with a NCO content of 20 to 31% is used as the binder. These prepolymers are obtainable by reacting polyisocyanates from the diphenylmethane diisocyanate series with a hydroxy-functional polyether having an EO content of more than 60 wt. %, with respect to the total amount of alkylene oxide used to prepare the polyether.

Any of the polyisocyanates from the diphenylmethane diisocyanate series may be used to prepare the prepolymer. Polyphenyl-polymethylene polyisocyanates such as those prepared by aniline/formaldehyde condensation followed by phosgenation ("crude MDI") are examples of suitable polyisocyanates. More highly fused isocyanates from the diphenylmethane diisocyanate series (pMDI types) are preferably used as the polyisocyanate component. The most preferred polyisocyanates have a monomeric diphenylmethane diisocyanate concentration of less than 55 wt. %.

The prepolymers useful in the practice of the present invention may be obtained by reacting the polyisocyanate with a hydroxy-functional polyether having an EO content of more than 60 wt. %, preferably more than 70 wt. %, with respect to the total amount of alkylene oxides used to prepare the polyether. The hydroxy-functional polyether generally has from 1 to 8, preferably 2 to 6, OH groups. Suitable polyethers will generally have a number average molecular weight of from 400 to 10,000 g/mol, most preferably 1,000 to 8,000 g/mol. Poly(oxypropylene-polyoxyethylene) polyols are preferably used.

The hydroxy-functional polyethers can be prepared by known processes, for example by anionic polymerization of an alkylene oxide in the presence of a starter compound which contains active hydrogen atoms. Suitable alkylene oxides contain from 2 to 4 carbon atoms in the alkylene group. Examples are, apart from ethylene oxide, tetrahydrofuran, 1,2-propylene oxide, 1,2- or 2,3-butylene oxide. Ethylene oxide (EO) and 1,2-propylene oxide (PO) are preferably used. The alkylene oxides may be used alternately, one after the other, or as mixtures.

Compounds with (number average) molecular weights of from 18 to 2,000 g/mol and 1 to 8 hydroxyl groups are preferably used as starter compounds which contain active hydrogen atoms. Examples of suitable starter compounds include: ethylene glycol, diethylene glycol, triethylene glycol, 1,2-propylene glycol, 1,4-butanediol, hexamethylene glycol, bisphenol A, trimethylolpropane, glycerine, pentaerythritol, sorbitol, cane sugar, degraded starch or water. Oligomeric alkoxylation products of the previously mentioned low molecular weight starters with (number average) molecular weights of 200 to 2,000 g/mol may also be used as starter compounds.

Reaction of the polyisocyanate and hydroxy-functional polyether is generally performed at temperatures of from 20 to 120° C. The polyisocyanate and hydroxy-functional polyether are used in amounts such that the prepolymer formed has an NCO content of from 20 to 31 wt. %, preferably from 22 to 28 wt. %. The prepolymers preferably have an equivalent weight of from 250 to 5,000 g/mol.

Suitable lignocellulose-containing raw materials and recycled materials based on plastics, which are bonded with a binder in accordance with the present invention, are, for example, wood, bark, cork, bagasse, straw, flax, bamboo, alfa grass, rice husks, sisal fibers and coconut fibers, as well as polyurethane rigid foams, polyurethane structural foams or other plastics. The material can be in the form of granules, strands, chips, fibers or powder and have a water content of, e.g., from 0 to 35 wt. %, preferably from 5 to 25 wt. %. The process of the present invention is particularly suitable for processing wood chips.

The raw, lignocellulose-containing material is mixed with the binder in an amount of from 1 to 100 wt. %, preferably 1.5 to 12 wt. %, and press molded to produce sheets or molded items, generally under the effects of pressure and heat (e.g., 70 to 250° C. and 1 to 150 bar).

Having thus described the invention, the following Examples are given as being illustrative thereof.

EXAMPLES

A. Prepolymers

To prepare the prepolymers, the relevant components were blended and then maintained at 95° C. for two hours with constant stirring.

Prepolymer 1

A prepolymer made from 840 g of a polymeric MDI ('pMDI') with an NCO content of about 31.5 wt. %

(commercially available under the name Desmodur® 44V20L from Bayer AG) and 210 g of a polyether polyol having an OH value of 36, started with glycerine, with 85% primary OH groups and a PO/EO ratio of 28 wt. %/72 wt. %. The prepolymer had an NCO content of 24.5 wt. % and a viscosity of 1400 mPa·s (25° C.).

Prepolymer 2

A prepolymer made from 840 g of Desmodur® 44V20L pMDI and 160 g of a polyether polyol having an OH value of 100, started with sorbitol, with 90% primary OH groups and a PO/EO ratio of 18 wt. % /82 wt. %. The prepolymer had an NCO content of 25.5 wt. % and a viscosity of 2500 mPa·s (25° C.).

Prepolymer 3

A prepolymer made from 775 g of Desmodur® 44V20L pMDI and 225 g of a polyether polyol having an OH value of 25, started with butyldiethylene glycol, with 90% primary OH groups and a PO/EO ratio of 15 wt. %/85 wt. %. The prepolymer had an NCO content of 23.4 wt. % and a viscosity of 620 mPa·s (25° C.).

Prepolymer 4

A prepolymer made from 266 g of Desmodur® 44V20L pMDI and 60 g of a polyethylene oxide with an OH value of 73, started with ethylene glycol. The prepolymer had an NCO content of 24.3 wt. % and a viscosity of 1300 mPa·s (25° C.).

Prepolymer 5

A prepolymer made from 840 g of Desmodur® 44V20L pMDI and 160 g of a polyether polyol having an OH value of 185, started with propylene glycol, with more than 90% primary OH groups and a PO/EO ratio of 3 wt. %/97 wt. %. The prepolymer had an NCO content of 24.1 wt. % and a viscosity of 3100 mPa·s (25° C.).

Prepolymer 6 (Comparison)

A prepolymer made from 1200 g of Desmodur® 44V20L pMDI and 300 g of a polyether polyol having an OH value of 28, started with trimethylolpropane, with 85% primary OH groups and a PO/EO ratio of 85 wt. %/15 wt. %. The prepolymer had an NCO content of 24.4 wt. % and a viscosity of 1240 mPa·s (25° C.).

Prepolymer 7 (Comparison)

A prepolymer made from 1200 g of Desmodur® 44V20L pMDI and 300 g of a polyether polyol having an OH value of 28, started with propylene glycol, with 85% primary OH groups, and a PO/EO ratio of 50 wt. %/50 wt. %. The prepolymer had an NCO content of 23.8 wt. % and a viscosity of 1200 mPa·s (25° C.).

B. Gluing the Chips

Wood chips from conifers and broad-leaved trees with an initial moisture content of 4.5 wt. % were glued in a laboratory gluing machine of the Drais batch mixer type using 1.3 bar air pressure and 0.3 bar binder pressure and 5.0 wt. % of the particular prepolymer, with respect to the dry weight (absolutely dry weight) of chips, as binder. At the same time, enough water was sprayed onto the chips for the final moisture content after gluing to amount to 15 wt. %.

The chips were introduced into a mold with the dimensions 400 mm×400 mm×33 mm. The molding obtained, which had a bulk density of 350 kg/m³, was compacted to a thickness of 10 mm at room temperature. The exposure time from the start of gluing to the start of compacting was 45 min.

C. Determining the Cold Bonding Strength

The mold was removed and the compacted chip-mat molding was moved forward on a flat surface over a free edge until the chip-mat broke. The length of the edge of the break is a measure of the cold bonding strength.

The results are summarized in the Table given below:

| Binder | Length of edge of break [mm] |
|---|---|
| Comparison examples | |
| Desmodur ® 44 V20L pMDI | 70 |
| Prepolymer 6 | 70 |
| Prepolymer 7 | 70 |
| Binder according to EP-A 352 558/Example 3 | 70 |
| Examples according to the invention | |
| Prepolymer 1 | 130 |
| Prepolymer 2 | 150 |
| Prepolymer 3 | 130 |
| Prepolymer 4 | 140 |
| Prepolymer 5 | 130 |

Molded items produced with a binder in accordance with the present invention had uniform strength values, even in the edge region.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a composite material comprising
    a) applying to a lignocellulose-containing material a binder comprising a urethane group-containing prepolymer having an NCO content of from 20 to 31% which is obtained by reacting a polyisocyanate of the diphenylmethane diisocyanate series with a hydroxy-functional polyether having an EO content of more than 60 wt. %, with respect to the total amount of alkylene oxides used to prepare the polyether, and
    b) press molding the lignocellulose-containing material to which the binder has been applied.

2. The process of claim 1 in which polymeric diphenylmethane diisocyanate (pMDI) with a concentration of monomeric diphenylmethane diisocyanate of less than 55 wt. % is used to produce the urethane group-containing prepolymer.

3. A composite lignocellulose-containing material produced by the process of claim 1.

* * * * *